Sept. 3, 1929.   W. L. BURNS   1,726,645
PRESSURE REGULATOR
Filed Aug. 11, 1927
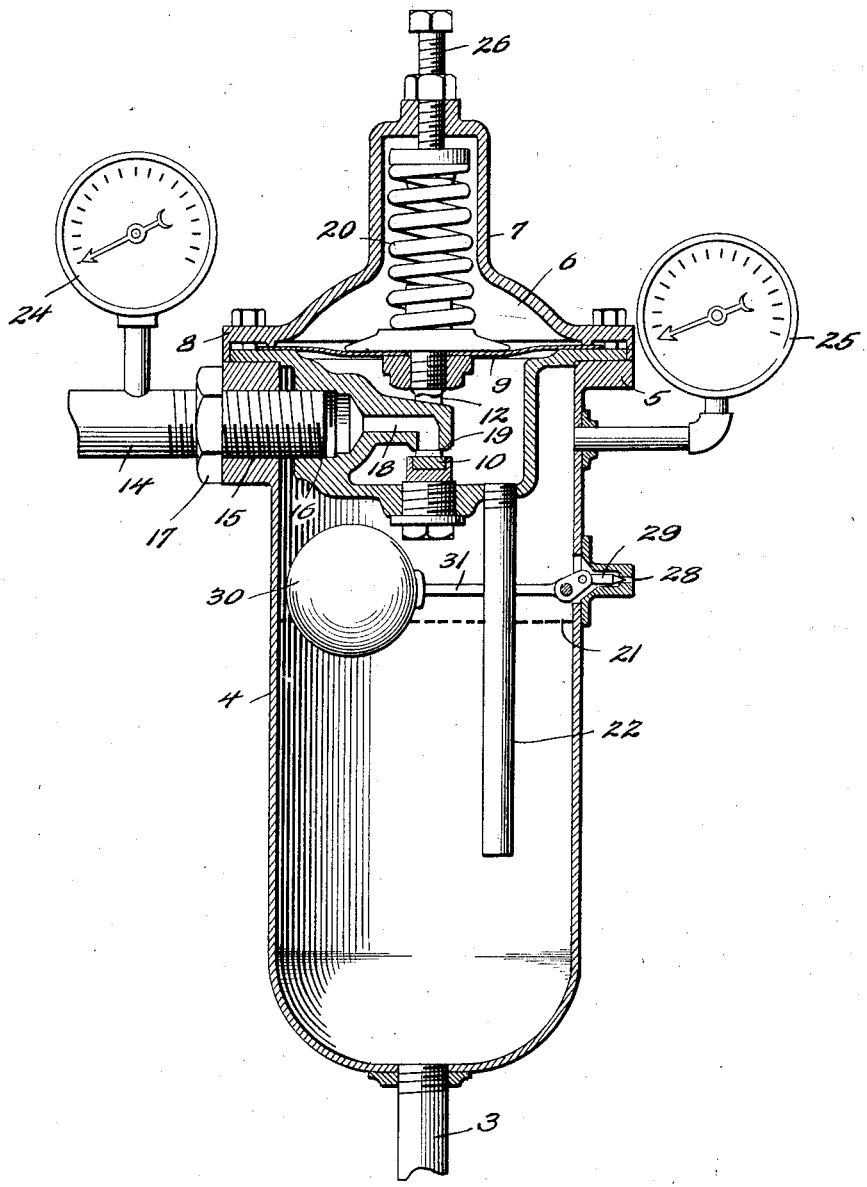
Inventor
William L. Burns
By H. W. T. Jenner
Atty Patented Sept. 3, 1929.

1,726,645

UNITED STATES PATENT OFFICE.

WILLIAM L. BURNS, OF BALTIMORE, MARYLAND, ASSIGNOR TO BURNS BOTTLING MACHINE WORKS, INCORPORATED, OF BALTIMORE, MARYLAND.

PRESSURE REGULATOR.

Application filed August 11, 1927. Serial No. 212,245.

This invention relates to means for automatically regulating the pressure of carbonated water supplied to bottling machines; and it consists of a pressure regulator adapted to be connected to each separate machine, and provided with devices which reduce and regulate the pressure of the liquid supplied to it, and which also eliminate surplus gas and air, as hereinafter fully described and claimed.

The drawing shows a vertical section through a pressure regulator constructed according to this invention.

In a bottling works where there are several machines each bottling a different pressure of carbonated water, and receiving the carbonated water from a main reservoir common to all the machines and arranged for maximum pressure, it is found necessary to reduce and regulate the pressure at each separate machine. It is also found that at each machine some free gas and air will separate from the water and cause undesirable irregularities in the working of the machine. In carrying out this invention each bottling machine is provided with a pressure regulator having a relatively small reservoir for carbonated water, which is auxiliary to the main supply reservoir.

A relatively small reservoir 4 is provided, adapted to hold about half a gallon of carbonated water, and is secured adjacent to the machine in any convenient way. A discharge pipe 3 for carbonated water is secured to the bottom of the reservoir 4, and is connected to the bottling machine in the usual way. The top of the reservoir is preferably provided with a flange 5, and a pressure reducing valve 6 of any approved construction is secured to the top of the reservoir. The casing 7 of the reducing valve has a flange 8 which is bolted to the flange 5 so as to close the top of the reservoir, and the lower portion of the casing depends within the reservoir.

In the reducing valve shown, a diaphragm of flexible material 9 is secured to the flange 8, and has the valve 10 connected to it by a loop 12. The inlet pipe 14 for carbonated water from the main reservoir, which is of any approved size and construction, is screwed into an opening 15 in the side of the reservoir 4, and into a socket 16 in the valve casing, and is held in water-tight relation with the reservoir by a jam nut 17. The valve casing has an angle-shaped inlet passage 18 communicating with the inlet pipe 14, and has a valve seat 19 over the valve 10. An adjustable regulating spring 20 is inclosed in the upper part of the casing, and presses the diaphragm and valve downwardly.

When the pressure inside the lower part of the valve casing exceeds a predetermined amount it raises the diaphragm and valve, and closes the valve seat, and the pressure in the lower part of the casing is kept at the desired reduced amount in this way.

A substantially uniform quantity of carbonated water is held in the reservoir 4, and the line 21 indicates the preferred water level. The lower part of the valve casing is provided with a delivery pipe 22 which depends from it, and projects below the level of the water in the reservoir, so that its upper part operates like an air vessel. A main pressure gage 24 is connected to the inlet pipe 14, and a reduced pressure gage 25 is connected to the reservoir 4. The spring 20 is regulated by a screw 26, and the reduced pressure in the reservoir 4 is adjusted to the requirements of the individual bottling machine to which it is attached.

An escape valve 28 for air and gas is provided at the side of the reservoir 4 above the water level, and 29 is a float valve which normally closes the outlet of the valve 28 when the regulator is in action. The float 30 of the valve is connected with it by a pivoted arm 31, and the float rests on the water in the reservoir.

When the bottling machine is started, and the carbonated water is admitted through the reducing valve, the water presses out the air in the reservoir until the water raises the float and closes the escape outlet. While the bottling machine is at work some air and gas separate from the water in the reservoir 4, and are trapped in its upper part above the water level. When this air and gas accumulates it forces down the water in the reservoir, and with it the float, which opens the escape valve, and permits the surplus air and gas to escape into the atmosphere. The incoming water then raises the float, and closes the escape valve. The variation in the level of the water in the reservoir is very slight, and a substantially uniform supply of about half a gallon of water is maintained at all times, which ensures a constant supply sufficient for several bottles. When the escape valve is closed the upper part of the reservoir 4 operates as an air vessel, and equalizes the delivery of the water from the main reservoir to the bottling machine.

What I claim is:

1. A pressure regulator for attachment to a bottling machine, comprising a reservoir for carbonated water having a discharge pipe at its lower part for connecting it to the bottling machine, a pressure reducing inlet valve for carbonated water provided with a member which closes the top of the reservoir and forms with it an air vessel, said valve having an outlet pipe which depends within the reservoir, and an automatic escape valve for gas and air mounted in the reservoir below the inlet valve and operating to relieve the air vessel of excess pressure.

2. A pressure regulator for a bottling machine, comprising a reservoir for carbonated water, having a discharge pipe at its lower part for connecting it to a bottling machine, a pressure reducing inlet valve for carbonated water provided with a casing having a flange which closes the top of the reservoir and forms an air vessel in its upper part, the lower portion of the said casing being supported within the upper part of the reservoir, an inlet pipe for carbonated water projecting through the side of the reservoir and connected to the lower portion of the said valve casing, an outlet pipe for carbonated water depending from the valve casing into the lower part of the reservoir, and an automatic escape valve for gas and air mounted in the reservoir below the inlet valve and operating to relieve the air vessel of excess pressure.

In testimony whereof I have affixed my signature.

WILLIAM L. BURNS.